United States Patent Office

3,634,280
Patented Jan. 11, 1972

3,634,280
GLOWING BOUNCING PUTTY
Hubert W. Dean, Guilford, and Almon G. Hovey, Northford, Conn., assignors to Peter Hodgson, Madison, Conn.
No Drawing. Filed Dec. 31, 1968, Ser. No. 788,347
Int. Cl. C09k 1/00; A63b 43/06
U.S. Cl. 252—301.3 R             6 Claims

ABSTRACT OF THE DISCLOSURE

A non-toxic novelty composition comprising various components, including a "bouncing putty," possessing unusual properties, particularly the ability to glow in the dark after exposure to a light source.

---

The present invention relates to a novelty composition having as its base a material known as "bounding putty" which will be hereinafter described in greater detail. In a more specific aspect, the invention relates to a safe, non-toxic novelty to be enjoyed by children, which comprises as its base a "bouncing putty" composition of unusual properties including glowability in the dark after it has been excited by light, and may, with some formulations, float in water.

The so-called "bounding putty" used in the compositions of this invention is preferably the solid gel-like heat reaction product of a dimethyl silicone oil with a minor portion of a compound of boron, preferably followed by a further treatment of the product with heat as catalyst, or both. By the term "dimethyl silicone" as used herein, is meant the oily methyl polysiloxane obtained by hydrolysis of a pure or substantially pure dimethyl silicone dihalide or equivalent hydrolyzable dimethyl silicone compound and containing an average of approximately two methyl groups per silicon atom, all or substantially all of the silicone silicon atoms being connected to two methyl groups. These compositions possess a unique combination of properties including both a high degree of elasticity or "bounce" under suddenly applied stresses, a high degree of plasticity when the stress is applied more slowly. Some of these compositions have pronounced cold flow properties in that a ball of this material will flow out into a thin disc in the course of hours. They do not flow appreciably under a rapid blow but will flow readily under the application of a low steady pressure. Other properties include excellent stability throughout a very wide temperature range. Thus as a base for an unusual novelty composition, it has application for use by children, both indoors and out doors in all climates and seasons. Most important, the "bouncing putty" component of these novel compositions are non-toxic and therefore safe for use by children of all ages. For a more detailed description of the "bouncing putty" reference is made to U.S. Pat. 2,541,851.

The compositions herein contemplated are unique in that they may be enjoyed by children in the form of novelty items at any hour of the day. In addition, since they are non-toxic they may be used without danger by children of all ages. In brief, the most unusual property of the present materials is their ability to glow in the dark for extended periods after excitation by a light source. In other words, combining the properties of bouncing putty with the ability to glow in the dark, confers upon the unmodified "bouncing putty" high imaginative uses that will stimulate and excite children. The success of any toy or novelty item is the degree of interest it sparks in children and the length of time that it occupies the child and holds his interest. Obviously, the compositions of this invention will interest and occupy children far beyond the normal range that children will play with unmodified bouncing putty and will stimulate its use in many ways never before contemplated. It will also be obvious that use will not be restricted to children since it will hold interest and prove novel in many ways to adults as well.

With regard to and in addition to the enjoyment that will be realized by children, the compositions offer a new tool useful in improving the psychological and emotional well being of children by proving to children normally afraid of the dark, that the dark can be enjoyed. To parents and psychologists it will be obvious that such an item will build confidence in children and bolster their sense of security when alone in the dark.

In general, the compositions are unique as novelty items and as a new psychological tool. With respect to some of its uses, the excitement of watching a "ball" bounce in the dark or of watching the same "ball" in the dark at rest assume a completely different configuration is obvious. In addition to the excitement it generates in very young children, the properties of the material are mysterious and will also create a great deal of wonderment and the desire to repeat the experience. For those mature children, the scientific principles for the strange behavior of the material will generate a high degree of curiosity for answers of a technical nature.

Broadly, the novel compositions of this invention are based on a silicon containing polymers of the type known as "bouncing putties" of the type more fully described in U.S. Pat. 2,541,851. The compositions are prepared by blending such polymer with varying amounts of phosphorescent compound, a flocculent material, a filler having a refractive index close to that of the base polymer and, if desired, a plasticizer.

In a more specific vein, the unique compositions herein described consist essentially of a clear transparent silicone polymer, a phosphorescent, non-toxic compound such as any of a group of metallic sulphides which have been activated by calcining in the presence of traces of copper and or other activating metals, at high temperatures in the absence of oxygen. Any material which affords stable phosphorescence in the presence of a silicone polymer putty comes within the scope of this invention. Also included is a clear filler such as small spheres of polyethylene resin or glass, a viscosity regulator such as flocculent silica and a plasticizer if necessary. In place of the polyethylene resin spheres, other plastic materials could be used, or even microscopic glass beads, particularly if the refractive index is close to that of the basic polymer, in order to improve the transparency of the material and reduce the light impedance of substances of greatly differing refractive indices.

The quantity of each component will vary with the properties desired in the product. Thus the silicone polymer will be the base and in major proportion. The other components based on the entire weight of the composition will range from 1 to 25 of phosphorescent material, 3 to 15% of the flocculent silica, 5 to 50% of the clear filler (transparent spheres). The reinforcing filler prevents the composition from collapsing and sinking into clothing and home furnishings.

The compositions of the invention are glowable in the dark and this property is achieved by exciting same with a source of light. The purpose of the plastic spheres is to keep the product as transparent as possible so that the highest percentage of the phosphorescent material may be excited by a light source and also to extend a normally expensive blend with a clear filler, thus reducing cost. The spheres or micro plastic beads or balls found most suitable are those having a diameter such that they will pass through a 325 mesh sieve, i.e., of a diameter .0017 inch or less.

The compositions of this invention will best be understood by reference to the following examples wherein all parts and percentages are by weight.

EXAMPLE 1

A blend was prepared by mixing 70% of a silicone polymer with 5% of flocculent silica, 17.5% of polyethylene micro beads, and 7.5% of activated zinc sulfide.

The mix was thoroughly blended to give a homogeneous product. Its properties were those normally attributable to bouncing putty compositions. In addition, upon excitation by bringing close to a light source, the product gave out a green light, could still be bounced and manipulated, and these movements were readily discernible by the eye in darkness.

The composition of this example was enclosed in a moon shaped clear polyethylene container which had been compounded with 2.5% of activated strontium sulfide/calcium sulfide pigment. Upon exposure of the container to light, a blue light was given out. Upon opening the container, the excited composition within gave out its green light. In this manner, a packaged novelty item capable of generating two different colors was obtained.

EXAMPLE 2

Another composition having properties similar to those of Example 1, was prepared by mixing 60% of a silicone polymer with 4.3% of fluocculent silica, 33% of low density polyethylene micro beads and 2.7% of activated zinc sulfide. The mix was thoroughly blended to give a homogeneous product. Its properties were those normally attributable to bounding putty compositions and upon excitation by light gave out a green light and could be handled as described in Example 1. Furthermore, owing to the large percentage of polyethylene, the specific gravity of the product was only 0.98 and it would float in water, adding to the play value in the dark.

It will be obvious to those skilled in the art of devising toys and novelties as well as psychological aides that the present compositions offer new and useful items heretofore unknown for silicone based compositions. Such uses are new and different and offer exciting, stimulating and and relaxing avenues for children as well as adults.

We claim:
1. A toy having the properties of bouncing putty and which glows in the dark comprising a non-toxic boron-modified polymeric dimethylsiloxane admixed with from 3 to 15%, by weight, of flocculent silica, 5 to 50%, by weight, of small transparent spheres having a refractive index close to that of said siloxane, 1 to 25% by weight, of a phosphorescent material, the balance of said composition being said siloxane.

2. The toy recited in claim 1 wherein the phosphorescent material is activated zinc sulfide.

3. The toy recited in claim 1 wherein the transparent spheres are glass.

4. The toy recited in claim 1 wherein the transparent spheres are polyethylene.

5. The toy recited in claim 1 wherein the non-toxic composition consists essentially of 70% of said polymeric dimethylsiloxane, 17.5% of small polyethylene spheres having a refractive index close to that of said siloxane, 5% of flocculent silica and 7.5% of activated zinc sulfide.

6. The toy recited in claim 1 wherein the non-toxic composition consists essentially of 60% of said polymeric dimethylsiloxane, 33% of low density polyethylene spheres having a refractive index close to that of said siloxane, 4.3% of flocculent silica and 2.7% of activated zinc sulfide.

References Cited

UNITED STATES PATENTS

| | | | |
|---|---|---|---|
| 2,609,201 | 9/1952 | Martin | 260—37 |
| 2,797,201 | 6/1957 | Veatch et al. | 260—2.5 |
| 2,919,474 | 1/1960 | Cole | 18—59 |
| 3,030,870 | 4/1962 | Gill | 94—1.5 |
| 3,177,176 | 4/1965 | Boot et al. | 260—37 |
| 3,238,156 | 1/1966 | Kohrn | 260—2.5 |
| 3,350,344 | 10/1970 | Beers | 260—37 |
| 3,502,589 | 3/1970 | Newing. | |

OTHER REFERENCES

Modern Plastics Encyclopedia, 1968 edition, pp. 573–5.

JAMES E. POER, Primary Examiner

A. P. DEMERS, Assistant Examiner

U.S. Cl X.R.

46—1; 260—37 SB, 465 G, 827; 273—58 R